(12) United States Patent
Wang et al.

(10) Patent No.: US 11,800,288 B2
(45) Date of Patent: Oct. 24, 2023

(54) DIAPHRAGM FOR SOUND GENERATING DEVICE AND SOUND GENERATING DEVICE

(71) Applicant: Goertek inc., Shandong (CN)

(72) Inventors: Shuqiang Wang, Shandong (CN); Bing Hui, Shandong (CN); Fengguang Ling, Shandong (CN); Chun Li, Shandong (CN); Chunfa Liu, Shandong (CN)

(73) Assignee: Goertek Inc., Shandong (CN)

( * ) Notice: Subject to any disclaimer, the term of this patent is extended or adjusted under 35 U.S.C. 154(b) by 0 days.

(21) Appl. No.: 17/619,049

(22) PCT Filed: Apr. 21, 2020

(86) PCT No.: PCT/CN2020/085752
§ 371 (c)(1),
(2) Date: Dec. 14, 2021

(87) PCT Pub. No.: WO2020/248717
PCT Pub. Date: Dec. 17, 2020

(65) Prior Publication Data
US 2022/0360902 A1     Nov. 10, 2022

(30) Foreign Application Priority Data
Jun. 14, 2019  (CN) .......................... 201910516202.4

(51) Int. Cl.
*H04R 7/12*     (2006.01)
*B32B 25/14*    (2006.01)
(Continued)

(52) U.S. Cl.
CPC ............. *H04R 7/125* (2013.01); *B32B 7/022* (2019.01); *B32B 25/042* (2013.01); *B32B 25/14* (2013.01);
(Continued)

(58) Field of Classification Search
CPC ..... H04R 2307/025; H04R 7/125; H04R 9/06
See application file for complete search history.

(56) References Cited

FOREIGN PATENT DOCUMENTS

| CN | 101469097 A | | 7/2009 |
|---|---|---|---|
| CN | 106792377 A | * | 5/2017 |

(Continued)

*Primary Examiner* — Sunita Joshi
(74) *Attorney, Agent, or Firm* — Baker Botts LLP (57) ABSTRACT

Disclosed are a diaphragm for a sound generating device and a sound generating device. The diaphragm comprising at least one elastomer layer, wherein the elastomer layer is made of an ethylene propylene diene monomer; and the ethylene propylene diene monomer is formed by polymerizing three monomers, the three monomers being an ethylene monomer, a propylene monomer and a non-conjugated diene monomer respectively, a mass ratio of the ethylene monomer to the propylene monomer ranging from 0.25 to 4, and content of the non-conjugated diene monomer being 1%-15% of total content of the ethylene monomer and the propylene monomer. The ethylene propylene diene monomer has excellent high-temperature resistance and thermo-oxidative aging resistance; and after the rubber is made into the diaphragm, the diaphragm is capable of working in a high-temperature environment for a long time, maintaining not only excellent elasticity but also excellent anti-fatigue characteristic, thereby possessing excellent reliability.

10 Claims, 3 Drawing Sheets

(51) Int. Cl.
    *H04R 9/02*      (2006.01)
    *H04R 9/06*      (2006.01)
    *H04R 31/00*     (2006.01)
    *B32B 7/022*     (2019.01)
    *B32B 25/04*     (2006.01)
    *C08J 5/18*      (2006.01)

(52) U.S. Cl.
    CPC .............. *C08J 5/18* (2013.01); *H04R 9/025* (2013.01); *H04R 9/06* (2013.01); *H04R 31/003* (2013.01); *B32B 2250/248* (2013.01); *B32B 2307/306* (2013.01); *B32B 2307/51* (2013.01); *B32B 2307/536* (2013.01); *B32B 2307/54* (2013.01); *B32B 2307/554* (2013.01); *B32B 2307/5825* (2013.01); *B32B 2307/732* (2013.01); *B32B 2457/00* (2013.01); *C08J 2323/16* (2013.01); *H04R 2307/025* (2013.01)

(56) References Cited

FOREIGN PATENT DOCUMENTS

| | | | |
|---|---|---|---|
| CN | 106792377 A | | 5/2017 |
| CN | 207070312 U | | 3/2018 |
| CN | 110283389 A | | 9/2019 |
| JP | 2997713 B2 | * | 1/2000 |

\* cited by examiner

DIAPHRAGM FOR SOUND GENERATING DEVICE AND SOUND GENERATING DEVICE

CROSS-REFERENCE TO RELATED APPLICATION

This application is a National Stage of International Application No. PCT/CN2020/085752, filed on Apr. 21, 2020, which claims priority to Chinese Patent Application No. 201910516202.4, filed on Jun. 14, 2019, both of which are hereby incorporated by reference in its entirety.

TECHNICAL FIELD

The present disclosure relates to the field of electroacoustic conversion, and in particular to a diaphragm for a sound generating device and a sound generating device.

BACKGROUND

With the progress of science and technology, electronics are being applied over an ever wider range. In particular, personal consumer electronics such as smart phones, tablet computers and smart watches are becoming increasingly popular on the market. Consequently, there is an increasing demand for miniature sound generating devices for use in personal consumer electronics.

In existing miniature sound generating devices, single-layer or multi-layer composite engineering plastics or thermoplastic elastomers are mostly used as diaphragm materials. Due to the limitation of the vibration space, the total thickness of the existing diaphragm is generally controlled to be within 100 μm, and the thickness of the single-layer diaphragm in the composite diaphragm is generally controlled to be within 20 μm. In addition, different from a large sound generating device, the miniature sound generating device is limited in size and accordingly generally uses a design without a centering disk, and the corrugated rim part of the diaphragm is very close to the voice coil. In the working process of the sound generating device, the working temperature of the diaphragm may even reach 180° C.

In the prior art, the diaphragm is made into a thin layer, and stress concentration points are easy to appear on the diaphragm in the vibration process. Moreover, the diaphragm needs to work at high temperature and perform repeated vibration, and the stress concentration position of the diaphragm becomes extremely fragile. In the stress concentration position, the engineering plastic diaphragm is easy to break, and in the high-temperature working process, the thermoplastic elastomer diaphragm is easy to soften and deform, such that the acoustic performance of the diaphragm becomes poor or the whole diaphragm is completely failed.

Compared with the abovementioned two diaphragms, an ethylene propylene diene monomer has not only excellent high temperature resistance, but also better resilience and higher elongation at break. In addition, after the ethylene propylene diene monomer is made into the diaphragm, the diaphragm further has excellent reliability while meeting the demand for acoustic performance.

SUMMARY

One objective of the present disclosure is to provide a diaphragm for a sound generating device and a sound generating device.

According to a first aspect of the present disclosure, provided is a diagram for a sound generating device. The diaphragm includes at least one elastomer layer, where the elastomer layer is made of an ethylene propylene diene monomer; and the ethylene propylene diene monomer is formed by polymerizing three monomers, the three monomers being an ethylene monomer, a propylene monomer and a non-conjugated diene monomer respectively, a mass ratio of the ethylene monomer to the propylene monomer ranging from 0.25 to 4, and content of the non-conjugated diene monomer being 1%-15% of total content of the ethylene monomer and the propylene monomer.

Optionally, the non-conjugated diene monomer includes at least one of ethylidene norbornene (ENB), dicyclopentadiene (DCPD) and 1,4-hexadiene (HD).

Optionally, the ethylene propylene diene monomer further includes a vulcanizing agent, the vulcanizing agent including at least one of a sulfur-type vulcanizing agent, a peroxide vulcanizing agent and a reactive resin vulcanizing agent.

Optionally, the sulfur-type vulcanizing agent includes sulfur, a stearic acid activator, an accelerator and zinc oxide, content of the sulfur being 1%-5% of total content of the ethylene propylene diene monomer, content of the accelerator being 0.4%-2% of the total content of the ethylene propylene diene monomer, content of the stearic acid activator being 0.4%-4% of the total content of the ethylene propylene diene monomer, and content of the zinc oxide being 0.4%-4% of the total content of the ethylene propylene diene monomer.

Optionally, the peroxide vulcanizing agent uses at least one of diisopropylbenzene peroxide, 1,3-bis(tert-butyldioxyisopropyl)benzene, 1,4-bis(tert-butyldioxyisopropyl)benzene, 2,5-bis(tert-butylperoxy)-2,5-dimethylhexane, and butyl 4,4'-bis(tert-butyldioxy)valerate, and content of the peroxide vulcanizing agent is 2%-8% of the total content of the ethylene propylene diene monomer.

Optionally, the reactive resin vulcanizing agent includes a reactive phenolic resin and an activator, content of the reactive phenolic resin being 5%-20% of the total content of the ethylene propylene diene monomer, and content of the activator being 0.5%-5% of the total content of the ethylene propylene diene monomer; and the activator being at least one of stannous chloride, ferrous chloride and bromodiphenylmethane.

Optionally, a reinforcing agent is further added into the ethylene propylene diene monomer, and includes at least one of carbon black, white carbon black and carbon nanotubes, and content of the reinforcing agent is 5%-90% of the total content of the ethylene propylene diene monomer.

Optionally, the diaphragm is a single-layer diaphragm, and is made of the elastomer layer; and a thickness of the single-layer diaphragm ranges from 10 μm to 200 μm.

Optionally, the diagram is a composite diaphragm including two, three, four or five diaphragm layers; and a thickness of the composite diaphragm ranges from 10 μm to 200 μm.

Optionally, at least two diaphragm layers of the composite diaphragm are the elastomer layers, and the elastomer layers have different hardness.

According to another aspect of the present disclosure, provided is a sound generating device. The sound generating device includes a vibration system and a magnetic circuit system matching the vibration system, where the vibration system includes the above diaphragm for a sound generating device.

The inventor of the present disclosure finds that in the prior art, a diaphragm layer of a diaphragm is thin, and stress concentration points are easy to appear on the diaphragm in a vibration process. Moreover, the diaphragm needs to work at a high temperature and perform repeated vibration, and a stress concentration position of the diaphragm becomes extremely fragile. Therefore, the technical task to be achieved or the technical problem to be solved by the present disclosure is never conceived or not expected by those skilled in the art, and therefore, the present disclosure is a new technical solution.

Advantages of the present disclosure: the ethylene propylene diene monomer of the present disclosure has excellent high-temperature resistance and thermo-oxidative aging resistance; and after the rubber is made into the diaphragm, the diaphragm is capable of working in a high-temperature environment for a long time, maintaining not only excellent elasticity but also excellent anti-fatigue characteristic, thereby possessing excellent reliability.

With reference to the detailed description of the accompanying drawings below on the exemplary embodiments of the present disclosure, other features and advantages of the present disclosure will become more apparent.

BRIEF DESCRIPTION OF THE DRAWINGS

The drawings, which are incorporated into and constitute a part of the description, illustrate the embodiments of the present disclosure and, together with the descriptions of the drawings, are used to explain principles of the present disclosure.

DESCRIPTION OF THE EMBODIMENTS

Various exemplary embodiments of the present disclosure will now be described in detail with reference to the accompanying drawings. It should be noted that: unless specifically stated otherwise, the relative arrangement of components and steps, numerical expressions, and numerical values set forth in these embodiments do not limit the scope of the present disclosure.

The following description of at least one exemplary embodiment is actually merely illustrative, and in no way serves as any limitation on the present disclosure and its application or use.

Techniques, methods, and apparatuses known to those of ordinary skill in the related field may not be discussed in detail but, where appropriate, should be considered a part of the description.

In all examples shown and discussed herein, any specific values should be interpreted as exemplary only and not as limitations. Therefore, other examples of the exemplary embodiment may have different values.

It should be noted that similar reference numerals and letters in the following drawings represent similar items, and therefore, once an item is defined in one drawing, the item does not need to be further discussed in subsequent drawings.

According to an embodiment of the present disclosure, provided is a diaphragm for a sound generating device. The diaphragm includes at least one elastomer layer, and may be a single-layer diaphragm structure or a composite diaphragm structure. The composite diaphragm includes a plurality of elastomer layers, which are compounded together in a laminated manner.

The elastomer layer is made of an ethylene propylene diene monomer; and the ethylene propylene diene monomer is formed by polymerizing three monomers including an ethylene monomer, a propylene monomer and a non-conjugated diene monomer. The ethylene monomer and the propylene monomer are a main chain in an ethylene propylene diene monomer molecular chain, and the main chain is composed of hydrocarbons having stable structures and are stable carbon-carbon bonds, and therefore, the ethylene propylene diene monomer has excellent high-temperature resistance and thermo-oxidative aging resistance. Moreover, there is no polar substituent group in an ethylene propylene diene monomer molecule, molecular cohesion energy is low, and therefore, the molecular chain is flexible, a material has excellent elasticity, and the material is made into the diaphragm, such that it may be guaranteed that the diaphragm has excellent anti-deformation capability and excellent anti-fatigue characteristic. Moreover, during long-term vibration in a high-temperature environment, the diaphragm maintains not only maintains excellent elasticity but also excellent fatigue resistance, thereby possessing excellent reliability.

According to an embodiment of the present disclosure, the inventor finds that a ratio of the ethylene monomer to the propylene monomer determines performance of raw rubber (the raw rubber refers to unvulcanized rubber) of the ethylene propylene diene monomer, and specifically, a mass ratio of the ethylene monomer is increased, such that strength of the ethylene propylene diene monomer may be increased, thermoplasticity of the ethylene propylene diene monomer may be improved, but resilience of the ethylene propylene diene monomer becomes poor; and a mass ratio of the propylene monomer is increased, such that the resilience of the ethylene propylene diene monomer may be improved, low-temperature resistance of the ethylene propylene diene monomer may be improved, but high-temperature resistance of the ethylene propylene diene monomer may be influenced by adding excessive propylene monomer.

The inventor finds that when the mass ratio of the ethylene monomer to the propylene monomer ranges from 0.25 to 4, strength of the ethylene propylene diene monomer is moderate, specifically, tensile resistance of the ethylene propylene diene monomer is strong, that is, when the ethylene propylene diene monomer is made into the diaphragm, the diaphragm may be made into any shape so as to adapt to a structure of a sound generating device. For example, the diaphragm is circular, rectangular or irregular; the resilience of the ethylene propylene diene monomer is high, when the ethylene propylene diene monomer is made into the diaphragm, vibration dynamic performance of the diaphragm is excellent, sound signals may be reasonably restored or played back, and audio performance of the diaphragm is balanced; and high-temperature resistance of the ethylene propylene diene monomer is excellent, and when the ethylene propylene diene monomer is made into the diaphragm, the diaphragm may work at high temperature for a long time and may well meet strict high-temperature resistance requirement of an existing miniature loudspeaker. Therefore, the diaphragm of the present disclosure has long service life and reliability.

Particularly, when the mass ratio of the ethylene monomer to the propylene monomer ranges from 0.2 to 2, the tensile resistance of the ethylene propylene diene monomer is strong, the resilience and rigidity performance thereof are excellent, the high-temperature resistance thereof is improved, vibration performance of the diaphragm made of the ethylene propylene diene monomer is excellent, and an audio frequency thereof is balanced, such that acoustic performance of the sound generating device is improved. For example, when an earphone is used, phenomena of muffled and unclear sound, etc. are easy to occur.

Table 1 is an influence of a mass ratio of the ethylene monomer to the propylene monomer on a glass transition temperature and a long-term working temperature. Glass transition temperature: a polymer material may generally be in the following four physical states (or mechanical states): a glassy state, a viscoelastic state, a highly elastic state (rubbery state) and a viscous flow state, transition between the glassy state and the highly elastic state is generally referred to as glass transition, and the transition temperature corresponding thereto is the glass transition temperature.

TABLE 1 influence of mass ratio of ethylene monomer to propylene monomer on glass transition temperature and long-term working temperature

| | Mass ratio of ethylene monomer to propylene monomer | | | | |
|---|---|---|---|---|---|
| | 0.25 | 0.5 | 1 | 2 | 4 |
| Glass transition temperature (° C.) | −65 | −62 | 60 | −58 | −55 |
| Long-term working temperature (° C.) | 150 | 160 | 170 | 175 | 180 |

As shown in table 1, when the mass ratio of the ethylene monomer to the propylene monomer ranges from 0.25 to 4, the glass transition temperature of the ethylene propylene diene monomer is gradually reduced and the long-term working temperature is gradually increased along with gradual increase of the mass ratio, where in the mass ratio range, the ethylene propylene diene monomer may work for a long term at a high temperature, and a state of the ethylene propylene diene monomer may not be broken by too high temperature.

According to an embodiment of the present disclosure, content of a non-conjugated diene monomer is 1%-15% of total content of the ethylene monomer and the propylene monomer. That is, when the total content of the ethylene monomer and the propylene monomer is 100 parts, the content of the non-conjugated diene monomer is 1-15 parts.

The inventor finds that the content of the non-conjugated diene monomer may influence a vulcanization speed and cross-linking density of the ethylene propylene diene monomer, and the higher the content of the non-conjugated diene monomer is, the higher the vulcanization speed of the ethylene propylene diene monomer is, and the higher the cross-linking density is. The cross-linking density may influence strength and tear resistance of the rubber, and when the cross-linking density is too high, although the strength of the rubber is high, the tear resistance may be sharply reduced, so that the rubber may not be used.

When the content of the non-conjugated diene monomer of the ethylene propylene diene monomer is 1%-15% of the total content of the ethylene monomer and the propylene monomer, heat resistance and wear resistance of the ethylene propylene diene monomer are improved, and tensile strength thereof is improved. When the ethylene propylene diene monomer is made into the diaphragm, the strength of the diaphragm is moderate, the tear resistance thereof is improved, and the wear resistance and the heat resistance thereof are improved.

The non-conjugated diene monomer uses at least one of ethylidene norbornene (ENB), dicyclopentadiene (DCPD) and 1,4-hexadiene (HD). Table 2 is an influence of the content of the non-conjugated diene monomer on tensile strength and elongation at break. The elongation at break is an indicator that measures elastic properties of a rubber. The tensile strength is capability of a rubber to resist permanent deformation and breakage under an action of an external force.

TABLE 2 influence of content of non-conjugated diene monomer on tensile strength and elongation at break

| | Content (parts) of non-conjugated diene monomer | | | | | |
|---|---|---|---|---|---|---|
| | 0.5 | 1 | 2 | 3 | 5 | 8 |
| Elongation at break (%) | 486 | 586 | 562 | 543 | 531 | 204 |
| Tensile strength (MPa) | 1.4 | 2.1 | 3.4 | 3.5 | 4.2 | 7.2 |

As shown in table 2, when the content of the non-conjugated diene monomer is 0.5 part, the tensile strength of the ethylene propylene diene monomer is low, that is, when the ethylene propylene diene monomer is made into the diaphragm, in order to adapt to various shapes of sound generating devices, the diaphragm is made into various shapes, and capability to resist permanent deformation and breakage under the action of the external force in a process that the diaphragm is mounted in the sound generating device is weak; and preferably, when the content of the non-conjugated diene monomer is 1-8 parts, the tensile strength of the ethylene propylene diene monomer is improved along with increase of the content of the non-conjugated diene monomer. The greater elongation at break gives greater vibration interval allowance to the diaphragm, the ethylene propylene diene monomer may bear higher driving force under the condition of being close to a break limit, and the stretching of the ethylene propylene diene monomer in the vibration process may not reach the break limit under the same vibration space, such that the condition of diaphragm breakage due to excessive stretching may be avoided. The ethylene propylene diene monomer has excellent flexibility, and the elongation at break thereof is greater than 150%, which is preferably greater than 200%. Therefore, particularly, when the content of the non-conjugated diene monomer is 8 parts, the elongation at break of the ethylene propylene diene monomer meets a manufacturing requirement of the diaphragm, ensuring a strong capability to resist permanent deformation and breakage, meeting elasticity and rigidity requirements of the diaphragm, thereby the sound generating device having excellent vibration performance and damping resistance performance.

Optionally, in order to polymerize the ethylene propylene diene monomer, the ethylene propylene diene monomer further includes a vulcanizing agent, where the vulcanizing agent uses at least one of a sulfur-type vulcanizing agent, a peroxide vulcanizing agent and a reactive resin vulcanizing agent.

Optionally, the sulfur-type vulcanizing agent includes sulfur, a stearic acid activator, an accelerator and zinc oxide, where content of the sulfur is 1%-5% of total content of the ethylene propylene diene monomer, content of the accelerator is 0.4%-2% of the total content of the ethylene propylene diene monomer, content of the stearic acid activator is 0.4%-4% of the total content of the ethylene propylene diene monomer, and content of the zinc oxide is 0.4%-4% of the total content of the ethylene propylene diene monomer.

The content of the sulfur may influence a cross-linking speed of the ethylene propylene diene monomer, the phenomenon of blooming and vulcanization back-mixing is easy to occur by excessive sulfur, and the inventor finds that when the content of sulfur is 1%-5% of the total content of the ethylene propylene diene monomer, that is, the total content of the ethylene propylene diene monomer is 100 parts and the content of the sulfur is 1-5 parts, the cross-linking speed of the ethylene propylene diene monomer is moderate, and vulcanized rubber performance of the ethylene propylene diene monomer is improved. Table 3 is an influence of the content of the sulfur-type vulcanizing agent on the tensile strength and the elongation at break.

TABLE 3 influence of content of sulfur-type vulcanizing agent on tensile strength and elongation at break

| | Mass parts (parts) of sulfur | | | | | |
|---|---|---|---|---|---|---|
| | 0.5 | 1 | 2 | 3 | 5 | 10 |
| Vulcanization speed | Extremely slow | Slow | Normal | Normal | Fast | Fast |
| Blooming condition | Non-blooming | Non-blooming | Non-blooming | Non-blooming | Blooming | Easy-blooming |
| Elongation at break (%) | 294 | 548 | 517 | 431 | 257 | 101 |

As shown in table 3, when the sulfur is 0.5 part by mass, the vulcanization speed of the ethylene propylene diene monomer is extremely slow, such that self-adhesion and mutual adhesion performance of the ethylene propylene diene monomer are poor, and processability thereof is poor; and when the sulfur is 1 part or 5 parts by mass, although the vulcanization speed is slow or fast, the processability of the ethylene propylene diene monomer is not influenced.

Preferably, when the sulfur is 2-3 parts by mass, the vulcanization speed is normal, such that in a processing process of the ethylene propylene diene monomer, a speed of an intermolecular chemical reaction is normal, a forming structure of the ethylene propylene diene monomer is uniform, the self-adhesion and mutual adhesion performance of the ethylene propylene diene monomer are excellent, and especially in the composite diaphragm structure, when the ethylene propylene diene monomer is used in a plurality of diaphragm layers, mutual adhesion capability between the layers is strong in a lamination compounding process of the plurality of diaphragm layers, when the ethylene propylene diene monomer is made into the diaphragm, the diaphragm has excellent vibration consistency in the vibration process, and conditions of diaphragm layer layering, etc. are not prone to occur, thereby prolonging service life of the diaphragm.

Optionally, the peroxide vulcanizing agent is peroxide, and uses at least one of diisopropylbenzene peroxide, 1,3-bis(tert-butyldioxyisopropyl)benzene, 1,4-bis(tert-butyldioxyisopropyl)benzene, 2,5-bis(tert-butylperoxy)-2,5-dimethylhexane, and butyl 4,4'-bis(tert-butyldioxy)valerate, and content of the peroxide is 2%-8% of total content of the ethylene propylene diene monomer. That is, when the total content of the ethylene propylene diene monomer is 100 parts, the content of the peroxide is 2-8 parts, and the content of excessive peroxide easily influences later secondary vulcanization of the ethylene propylene diene monomer.

Optionally, the reactive resin vulcanizing agent includes a reactive phenolic resin and an activator, where addition of the activator in the reactive phenolic resin is to assist cross-linking (the cross-linking of the present disclosure refers to vulcanization of the ethylene propylene diene monomer) of the ethylene propylene diene monomer. Content of the reactive phenolic resin is 5%-20% of the total content of the ethylene propylene diene monomer, and content of the activator is 0.5%-5% of the total content of the ethylene propylene diene monomer. The activator uses at least one of stannous chloride, ferrous chloride and bromodiphenylmethane.

Optionally, a reinforcing agent is further added into the ethylene propylene diene monomer, and includes at least one of carbon black, white carbon black and carbon nanotubes, and content of the reinforcing agent is 5%-90% of total content of the ethylene propylene diene monomer. That is, when the total content of the ethylene propylene diene monomer is 100 parts, the content of the reinforcing agent is 5-90 parts.

Optionally, an internal releasing agent (releasing agent added into the ethylene propylene diene monomer) is further added into the ethylene propylene diene monomer, and includes at least one of stearic acid and stearate, octadecylamine and alkyl phosphate, and α-octadecyl-co-hydroxy polyoxyethylene phosphate, the ethylene propylene diene monomer is 100 parts by mass, and the internal releasing agent is 0.5-5 parts by mass. Optionally, the internal releasing agent is 1-3 parts by mass. Stripping capability of the ethylene propylene diene monomer is related to the mass part of the releasing agent, when the mass part of the releasing agent is small, a forming state of the ethylene propylene diene monomer is excellent, but the stripping capability thereof is poor, when the mass part of the stripping agent is great, stripping performance of the ethylene propylene diene monomer is obviously improved, but the releasing agent of the formed ethylene propylene diene monomer is easy to separate out, and accumulated on a surface of a mold to pollute the mold. The inventor finds that when the internal releasing agent is 1-3 parts by mass, the forming state of the formed ethylene propylene diene monomer is excellent, and residues are small after forming.

Figure 1:
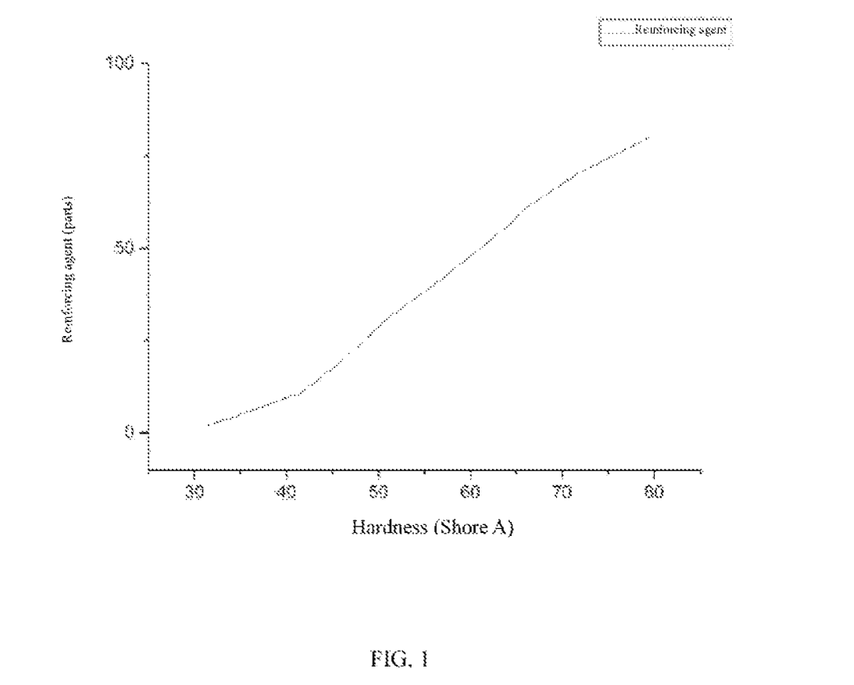
FIG. 1 is a relational graph between content of a reinforcing agent in an ethylene propylene diene monomer and hardness of a diaphragm in the present disclosure.
Figure 2:
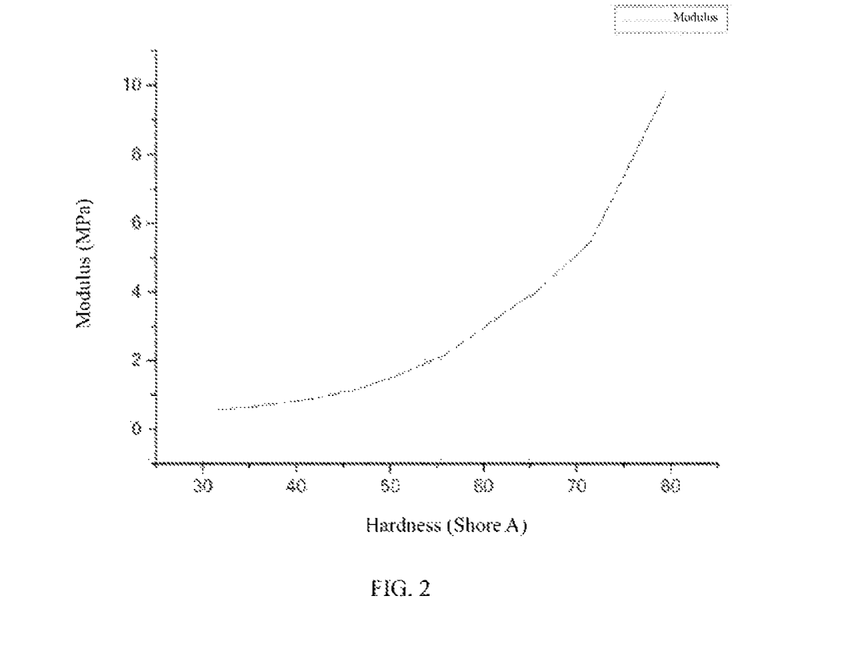
FIG. 2 is a relational graph between hardness and a modulus of the diaphragm in the present disclosure.
Figure 3:
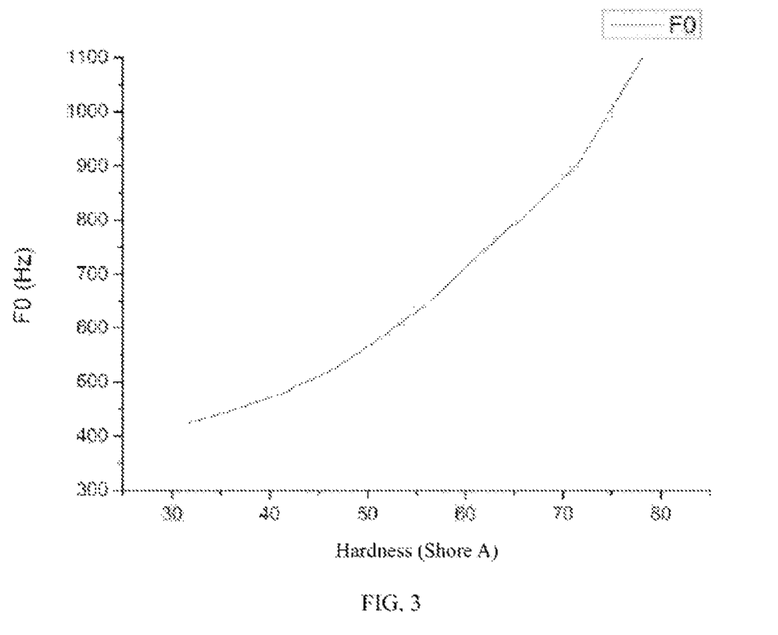
FIG. 3 is a relational graph between the hardness and a resonant frequency (F0) of the diaphragm in the present disclosure.

As shown in FIG. 1, the content of the reinforcing agent is in direct proportion to the hardness of the ethylene propylene diene monomer, the hardness of the ethylene propylene diene monomer is increased along with increase of addition amount of the reinforcing agent, but when the content of the reinforcing agent is too high, the elongation at break of the ethylene propylene diene monomer is sharply reduced, such that the diaphragm is easy to break. As shown in FIG. 2, a modulus of the ethylene propylene diene monomer is increased along with increase of the hardness of the ethylene propylene diene monomer, the modulus of the ethylene propylene diene monomer is increased, and the resilience and the damping performance of the diaphragm are improved; and as shown in FIG. 3, under the condition that the thickness of the diaphragm structure is consistently the same, the modulus of the diaphragm is increased, a resonant frequency (F0) of a corresponding product is increased accordingly, and high-frequency performance of the sound generating device is improved.

According to an embodiment of the present disclosure, the diaphragm is a single-layer diaphragm, and the F0 of the diaphragm may be adjusted to meet an expected requirement by adjusting the hardness and the thickness of the diaphragm according to requirements of different electronics. The low thickness may influence reliability and the high thickness may influence sensitivity of the diaphragm, and therefore, the diaphragm application thickness of the single-layer diaphragm of the present disclosure is 10 μm to 200 μm, which is preferably 20 μm to 150 μm.

Optionally, when the thickness of the single-layer diaphragm ranges from 50 μm to 150 μm, the thickness range enables the sensitivity of the diaphragm for a sound generating device to be higher, the elastic performance and the rigidity performance of the diaphragm both may meet the manufacturing requirements of the sound generating device, and the diaphragm is used as the weakest element in the sound generating device and is not easy to break in the repeated vibration process, thereby prolonging the service life of the sound generating device. Particularly, the thickness of the single-layer diaphragm is 60 μm, the diaphragm of the present disclosure is more flexible relative to an existing engineering plastic diaphragm and accordingly has excellent bending resistance, the diaphragm is the flexible single-layer diaphragm, stress of the diaphragm is more dispersed in the repeated vibration process, and therefore, the diaphragm of the present disclosure is not prone to break, and reliability performance of the sound generating device is excellent.

The diaphragm of the present disclosure has low density, under the condition of the same thickness, the diaphragm made of the ethylene propylene diene monomer is lighter in weight and easier to vibrate, and therefore, the diaphragm has higher sensitivity, and meanwhile, the high-frequency characteristic of the sound generating device is excellent.

The diaphragm is a composite diaphragm, the composite diaphragm includes two, three, four or five diaphragm layers, and the diaphragm layers are compounded together by using ethylene propylene diene monomer having different hardness. The thickness of the composite diaphragm ranges from 10 to 200 μm.

Figure 4:
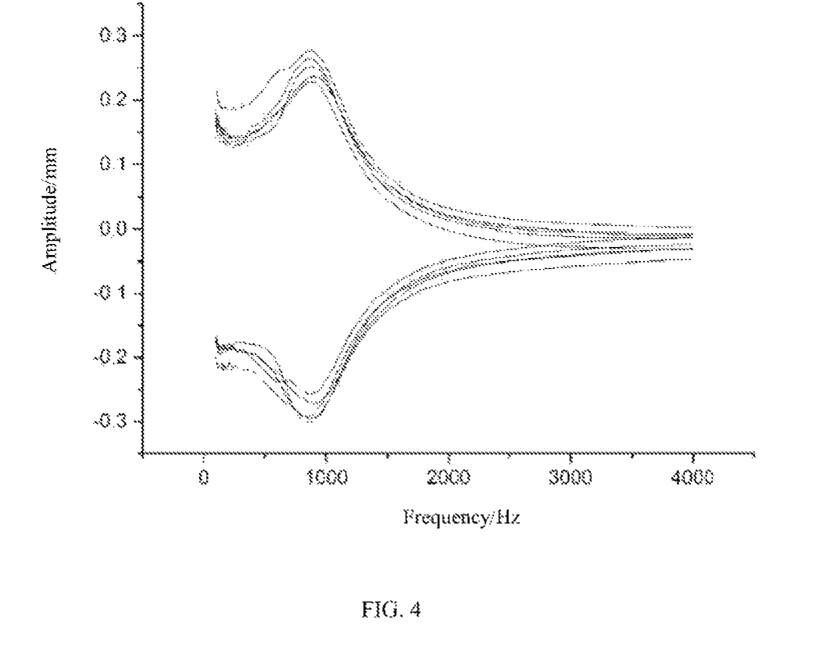
FIG. 4 is a five-point amplitude schematic diagram of a diaphragm in the prior art.
Figure 5:
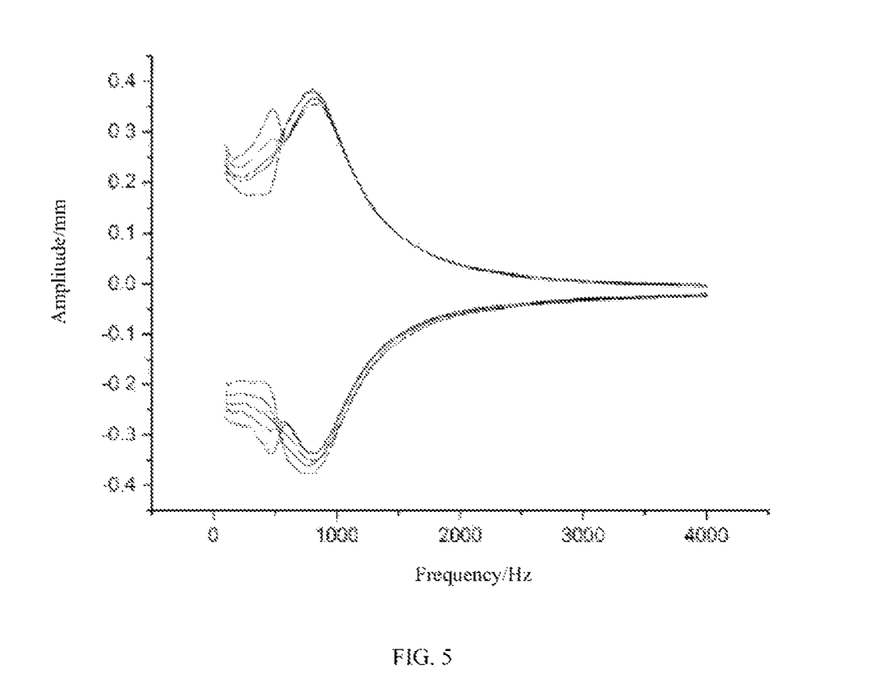
FIG. 5 is a five-point amplitude schematic diagram of the diaphragm in the present disclosure.

At least one diaphragm layer of the composite diaphragm is the elastomer layer. Preferably, two or three elastomer layers are used. In such implementation, the hardness of the elastomer layers may be different. Specifically, the composite diaphragm is compounded together by using ethylene propylene diene monomer having different hardness, for example, the hardness of the diaphragm layer of the composite diaphragm is gradually increased from top to bottom, a diaphragm layer of a substrate layer uses the ethylene propylene diene monomer having great hardness, the rigidity of the diaphragm is strong while the hardness is great, and the diaphragm layer of the substrate layer has an effect of centering and supporting an upper diaphragm layer. The hardness of the upper diaphragm layer is small, and the elongation at break thereof is great, such that the diaphragm has more excellent strain bearing capability, and a vibration amplitude of the diaphragm is great. The "amplitude" refers to an unidirectional maximum value at which the diaphragm deviates from an equilibrium position. As shown in FIGS. 4 and 5, FIG. 4 is a schematic diagram of an amplitude of a diaphragm in the prior art, and FIG. 5 is a schematic diagram of an amplitude of the diaphragm in the present disclosure. Compared with the prior art, the diaphragm of the present disclosure has a great amplitude than the diaphragm in the prior art, and under the condition of the relatively great amplitude, for example, the amplitude of the present disclosure is 0.4 mm, loudness of the diaphragm within the vibration range is greater, and a sound listening effect is excellent.

Optionally, the composite diaphragm is formed by compounding elastomer layers made of different materials, at least one diaphragm layer of the composite diaphragm is made of the ethylene propylene diene monomer, the hardness of the diaphragm layers of the composite diaphragm may be different, or the composite diaphragm is a diaphragm formed by compounding the ethylene propylene dime monomer with other engineering plastics or thermoplastic elastomers in a fitting manner.

The thickness of the composite diaphragm ranges from 10 μm to 200 μm, preferably, when the thickness of the composite diaphragm ranges from 20 μm to 150 μm, the thickness range enables the sensitivity of the diaphragm for a sound generating device to be higher, under the condition that the same driving force is applied, the diaphragm having the diaphragm thickness meeting the above range may generate greater amplitude relative to other diaphragms, and further, vibration space allowance of a vibration system is greater. Particularly, the thickness of the composite diaphragm is 60 μm, the stress is dispersed in the repeated vibration process of the composite diaphragm, and compared with an existing diaphragm material, the ethylene propylene diene monomer has more excellent elongation at break and is not easy to break and crack under the condition of the same strain.

Figure 6:
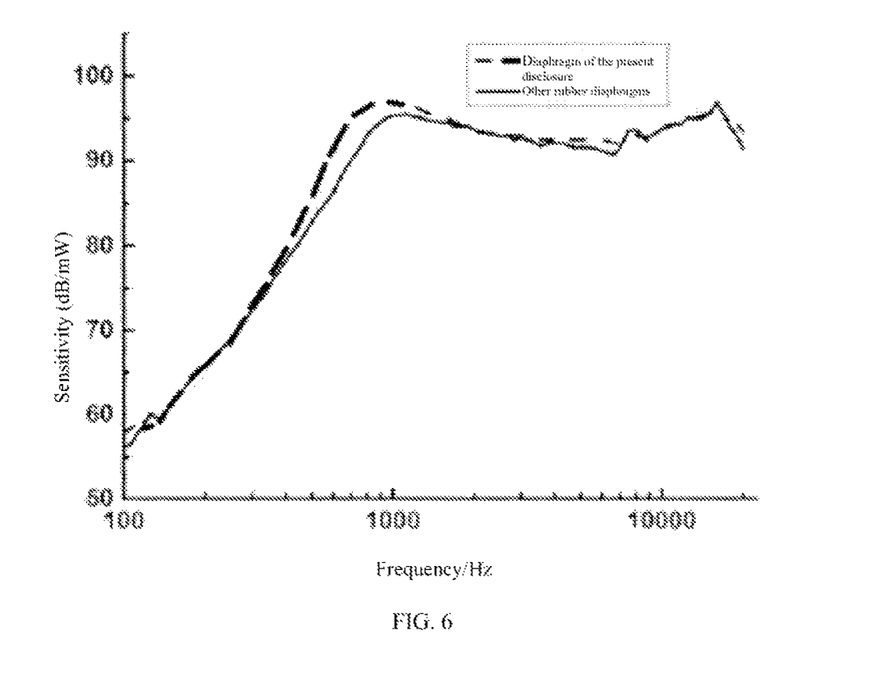
FIG. 6 is a comparison chart of a sensitivity relation of the diaphragm in the present disclosure and other rubber diaphragms in the prior art.

FIG. 6 is a comparison chart of a sensitivity relation of the diaphragm in the present disclosure and other rubber diaphragms in the prior art. An abscissa is frequency (Hz), and an ordinate is sensitivity (dB/mW); a solid line is a relational graph of a frequency and sensitivity of other rubber diaphragms, and a dotted line is a relational graph of a frequency and sensitivity of the diaphragm made of the rubber in the present disclosure. For example, under the same frequency, the sensitivity of the diaphragm made of the ethylene propylene diene monomer are greater than those of other rubber diaphragms, and particularly, the sensitivity of the diaphragm made of the rubber in the present disclosure is obviously greater than that of other rubber diaphragms when the frequency is 1 k. The sensitivity of the sound generating device refers to the magnitude of power needing to be input under the condition of the same loudness, and the higher the sensitivity is, the smaller the needed input power is.

According to an embodiment of the present disclosure, provided is a sound generating device. The sound generating device includes a vibration system and a magnetic circuit system matching the vibration system, where the vibration system includes the above diaphragm for a sound generating device. The diaphragm for a sound generating device may work for a long time at a high temperature and a stress concentration position is not easy to break in a process of repeated vibration, and meanwhile, the sound generating device has excellent acoustic performance.

Although some specific embodiments of the present disclosure are described in detail by means of examples, those skilled in the art should understand that the above examples are merely for illustration instead of limitation of the scope of the present disclosure. Those skilled in the art should understand that modifications to the above embodiments may be made without departing from the scope and spirit of the present disclosure. The scope of the present disclosure is defined by the appended claims.

What is claimed is:

1. A diaphragm for a sound generating device, comprising at least one elastomer layer, wherein the elastomer layer is made of an ethylene propylene diene monomer formed by polymerizing an ethylene monomer, a propylene monomer and a non-conjugated diene monomer, wherein a mass ratio of the ethylene monomer to the propylene monomer ranges from 0.25 to 4, and the non-conjugated diene monomer comprises 1%-15% of a total of the ethylene monomer and the propylene monomer, and the ethylene propylene diene monomer further comprises a vulcanizing agent, the vulcanizing agent is selected from the group consisting of a sulfur-type vulcanizing agent, a peroxide vulcanizing agent and a reactive resin vulcanizing agent.

2. The diaphragm according to claim 1, wherein the non-conjugated diene monomer is selected from the group consisting of ethylidene norbornene (ENB), dicyclopentadiene (DCPD) and 1,4-hexadiene (HD).

3. The diaphragm according to claim 1, wherein the sulfur-type vulcanizing agent comprises sulfur, a stearic acid activator, an accelerator and zinc oxide, the sulfur being 1%-5% of the ethylene propylene diene monomer, the accelerator being 0.4%-2% of the ethylene propylene diene monomer, the stearic acid activator being 0.4%-4% of the ethylene propylene diene monomer, and the zinc oxide being 0.4%-4% of the ethylene propylene diene monomer.

4. The diaphragm according to claim 1, wherein the peroxide vulcanizing agent is selected from the group consisting of diisopropylbenzene peroxide, 1,3-bis(tert-butyldioxyisopropyl)benzene, 1,4-bis(tert-butyldioxyisopropyl)benzene, 2,5-bis(tert-butylperoxy)-2,5-dimethylhexane, and butyl 4,4'-bis(tert-butyldioxy)valerate, and the peroxide vulcanizing agent is 2%-8% of the ethylene propylene diene monomer.

5. The diaphragm according to claim 1, wherein the reactive resin vulcanizing agent comprises a reactive phenolic resin and an activator, the reactive phenolic resin being 5%-20% of the ethylene propylene diene monomer, and the activator being 0.5%-5% of the ethylene propylene diene monomer; and the activator is selected from the group consisting of stannous chloride, ferrous chloride and bromodiphenylmethane.

6. The diaphragm according to claim 1, wherein the ethylene propylene diene monomer further comprises a reinforcing agent, selected from the group consisting of carbon black, white carbon black and carbon nanotubes, and wherein the reinforcing agent is 5%-90% of the ethylene propylene diene monomer.

7. The diaphragm according to claim 1, wherein the diaphragm is a single-layer diaphragm, and is made of the elastomer layer; and a thickness of the single-layer diaphragm ranges from 10 μm to 200 μm.

8. The diaphragm according to claim 1, wherein the diagram is a composite diaphragm comprising two, three, four or five diaphragm layers; and a thickness of the composite diaphragm ranges from 10 μm to 200 μm.

9. The diaphragm according to claim 8, wherein at least two diaphragm layers of the composite diaphragm are the elastomer layers having different hardness.

10. A sound generating device, comprising a vibration system and a magnetic circuit system matching the vibration system, wherein the vibration system comprises the diaphragm for the sound generating device of claim 1.

* * * * *